(12) United States Patent
Lupke et al.

(10) Patent No.: US 11,407,161 B2
(45) Date of Patent: Aug. 9, 2022

(54) FINNED MOLD BLOCK

(71) Applicants: Manfred A. A. Lupke, Thornhill (CA); Stefan A. Lupke, Thornhill (CA)

(72) Inventors: Manfred A. A. Lupke, Thornhill (CA); Stefan A. Lupke, Thornhill (CA)

( * ) Notice: Subject to any disclaimer, the term of this patent is extended or adjusted under 35 U.S.C. 154(b) by 0 days.

(21) Appl. No.: 17/427,026

(22) PCT Filed: Jan. 31, 2020

(86) PCT No.: PCT/CA2020/050116
§ 371 (c)(1),
(2) Date: Jul. 29, 2021

(87) PCT Pub. No.: WO2020/154814
PCT Pub. Date: Aug. 6, 2020

(65) Prior Publication Data
US 2022/0097281 A1    Mar. 31, 2022

(30) Foreign Application Priority Data
Jan. 31, 2019   (CA) ................................ CA 3032164

(51) Int. Cl.
*B29C 48/88*      (2019.01)
*B29C 48/30*      (2019.01)
(Continued)

(52) U.S. Cl.
CPC .......... *B29C 48/9115* (2019.02); *B29C 33/02* (2013.01); *B29C 48/0013* (2019.02);
(Continued)

(58) Field of Classification Search
CPC ... B29C 33/02; B29C 48/911; B29C 48/9115; B29C 48/13; B29C 43/226;
(Continued)

(56) References Cited

U.S. PATENT DOCUMENTS

| 3,751,541 A | * | 8/1973 | Hegler | ................ B29C 49/0021 |
| | | | | 425/303 |
| 4,199,314 A | * | 4/1980 | Lupke | ..................... B29C 48/09 |
| | | | | 425/537 |

(Continued)

FOREIGN PATENT DOCUMENTS

| CN | 206416489 U | 8/2017 |
| CN | 207841876 U | 9/2018 |
| JP | 2016074090 A | 5/2016 |

OTHER PUBLICATIONS

European Patent Office, English abstract for CN206416489U, printed on Jul. 16, 2021.

(Continued)

*Primary Examiner* — Jeffrey M Wollschlager
(74) *Attorney, Agent, or Firm* — Cahn & Samuels, LLP (57) ABSTRACT

Mold blocks of a pipe molding corrugator are provided with enhanced cooling capability due to the provision of cooling fins on the side portions of each mold block. Air can be forced between the fins and some exhaustion of the air can occur at the base of the fins adjacent the mold block cavity. With this arrangement, enhanced cooling of mold blocks is possible.

17 Claims, 10 Drawing Sheets

(51) Int. Cl.
　　　B29C 48/90　　　(2019.01)
　　　B29C 48/00　　　(2019.01)
　　　B29C 33/02　　　(2006.01)
　　　B29C 53/30　　　(2006.01)
　　　B29C 49/00　　　(2006.01)
　　　B29L 23/18　　　(2006.01)
(52) U.S. Cl.
　　　CPC .......... B29C 48/303 (2019.02); B29C 48/903 (2019.02); B29C 53/30 (2013.01); *B29C 49/0015* (2013.01); *B29L 2023/18* (2013.01)
(58) Field of Classification Search
　　　CPC ............ B29C 49/0015; B29C 49/0021; B29C 49/0026; B29C 53/305; B29C 53/30; B29C 49/38; B29C 49/34; F16L 9/06; F16L 11/11; F16L 11/15
　　　USPC .................. 264/505, 506, 508; 425/336, 522
　　　See application file for complete search history.

(56) References Cited

U.S. PATENT DOCUMENTS

| | | | | |
|---|---|---|---|---|
| 4,319,872 | A * | 3/1982 | Lupke | B29C 48/13 425/326.1 |
| 4,439,130 | A * | 3/1984 | Dickhut | B29C 33/36 425/188 |
| 4,504,206 | A * | 3/1985 | Lupke | B29C 49/0021 425/185 |
| 4,718,844 | A * | 1/1988 | Dickhut | B29C 33/10 425/522 |
| 5,002,478 | A * | 3/1991 | Lupke | B29C 49/0021 425/336 |
| 5,372,774 | A * | 12/1994 | Lupke | B29C 49/0021 425/336 |
| 6,719,942 | B1* | 4/2004 | Triplett | B29C 48/303 425/336 |
| 2008/0116604 | A1* | 5/2008 | Thomas | B29C 48/911 264/237 |
| 2010/0252963 | A1* | 10/2010 | Scharf | B29C 49/4823 425/526 |
| 2017/0217080 | A1* | 8/2017 | Lupke | B29C 33/42 |

OTHER PUBLICATIONS

European Patent Office, English abstract for CN207841876U, printed on Jul. 16, 2021.

European Patent Office, English abstract for JP2016074090A, printed on Jul. 16, 2021.

Canadian Intellectual Property Office, International Search Report for PCT/CA2020/050116, dated May 4, 2020, pp. 1-3.

Canadian Intellectual Property Office, Written Opinion for PCT/CA2020/050116, dated May 4, 2020, pp. 1-5.

* cited by examiner

FINNED MOLD BLOCK

FIELD OF THE INVENTION

The present invention relates to mold blocks used in pipe corrugators and in particular, is directed to mold blocks with improved heat dissipation and to pipe corrugators that use these improved mold blocks.

BACKGROUND OF THE INVENTION

Opposed series of mold blocks are used in pipe corrugators to form a moving mold tunnel. The opposed mold blocks come into abutment defining a pipe mold cavity at an inlet to the moving mold tunnel and the mold blocks separate at a downstream end of the mold tunnel. A thin envelope of extruded plastic is introduced to the mold tunnel adjacent the inlet and drawn or forced into the mold cavity defined by the opposed mold blocks.

The mold blocks continue to move, preferably with a vacuum source drawing the plastic into the mold cavity. A large portion of the pipe corrugator is designed to cool the extruded plastic sufficiently such that the formed pipe maintains its shape allowing the mold blocks to separate. Various arrangements have been provided to efficiently remove heat from the mold blocks and effectively remove heat from the partially formed extruded plastic pipe.

A high rate of heat removal from the mold blocks is desirable as it impacts other factors such as the length of the pipe corrugator. A certain amount of heat must be removed to cool the plastic to a suitable temperature prior to the mold blocks separating and returning to the inlet of the pipe corrugator. The rate of heat removal, the length of the pipe corrugator, the speed of the moving mold tunnel and the temperature of the atmosphere about the mold blocks are all interrelated. Efficient heat removal can shorten the length of a corrugator and reduce the cost thereof. In most situations, it is desirable to increase the rate of heat removal and it is also desirable to easily control the rate heat is removed.

The mold blocks are typically made of a cast aluminum material and are subsequently machined to provide the appropriate vacuum and cooling channels, the finished faces for the mold cavity, as well as any provisions for the driving of the mold blocks along the length of the pipe corrugator.

Various cooling arrangements have been used to increase the rate of heat removal from the mold blocks. Typically, these mold blocks include vacuum ports in the mold cavity to draw the hot plastic into engagement with the mold faces of the mold blocks. Once the plastic has been shaped by the mold face, the vacuum force can be reduced or eliminated. It has been known to use these vacuum channels to supply cooling air into a gap between the molded product and the pipe mold cavity. Basically, the molded plastic shrinks somewhat as it is cooled, forming a gap relative to the mold cavity. Other arrangements have provided cooling air flows through interior channel passages of the mold blocks to remove heat therefrom. Water or liquid cooling of the mold blocks has many disadvantages typically associated with sealing and leakage.

It is also known to provide relatively thick ridge projections on the exterior of the mold blocks to increase the dissipation of heat to the surrounding atmosphere due to the increased surface area and mass of the mold blocks. It has also been known to provide a cool controlled atmosphere about a portion of the pipe corrugator to further increase or control the rate of heat removal.

It can further be appreciated that mold blocks with larger mass, take longer to cool. Thus reducing the mass of the mold blocks provides an increased rate of heat removal.

The present invention allows for enhanced heat transfer from the mold block to the surrounding atmosphere using a finned mold block design with enhanced air flow.

SUMMARY OF THE INVENTION

A mold block for use in a pipe corrugator comprises a metal body having an open mold cavity in a top side of the mold block with a base portion of the mold block being configured to connect with a drive mechanism of the pipe corrugator. Two opposed side portions of the mold block are adapted to transfer heat of the mold block to the surrounding atmosphere primarily by convection. These opposed side portions include cooling fins positioned on the exterior of the mold block.

According to an aspect of the invention, the fins are orientated to be generally parallel to a longitudinal axis of the mold cavity In a further aspect of the invention, the mold block comprises a seal on the split face surface and a coupling apparatus located between the edge of the cooling fins and the seal.

In a further aspect of the invention, the fins are of different depths and the fins progressively increase in depth from a split surface on the top side of the mold block towards the base portion of the mold block. Preferably the free ends of each series of fins on a side of the mold block align in a common plane.

In a further aspect of the invention, the gap between adjacent fins is 1 to 3 times as wide as the thickness of one of the fins.

In a further aspect of the invention, the gap between adjacent fins is 1 to 2 times as wide as the thickness of one of said fins.

In a further aspect of the invention, the split mold block further comprises a thick top fin and a base 12 each having an outward edge. The fins are configured such that an outward edge of each of said fins is inset of the outward edge of each of the thick top fin and said base to protect the fins from damage.

According to an aspect of the invention, the cooling fins can also include a series of connecting ports passing through the fins to enhance airflow movement across the fins and improve heat transfer during use of the mold block.

In a further aspect of the invention, the connecting ports are provided in the fins adjacent the junction of the fins to the metal body. This arrangement reduces air stalling between the fins adjacent the metal body.

In a further aspect of the invention, a series of connecting ports are provided in each mold block spaced in the length of the mold block with these ports forming passages through a base portion of the fins. In this structure, the base portion of adjacent fins include airflow connecting ports allowing airflow to move into the gaps between adjacent cooling fins.

In a further aspect of the invention, the connecting ports include connecting ports through the base portion. Preferably a vacuum source is provided at the base portion of the mold blocks as they move through the mold tunnel to further improve airflow across the fins.

BRIEF DESCRIPTION OF THE DRAWINGS

Preferred embodiments of the invention are shown in the Drawings wherein.

DETAILED DESCRIPTION OF THE PREFERRED EMBODIMENTS

Figure 2:
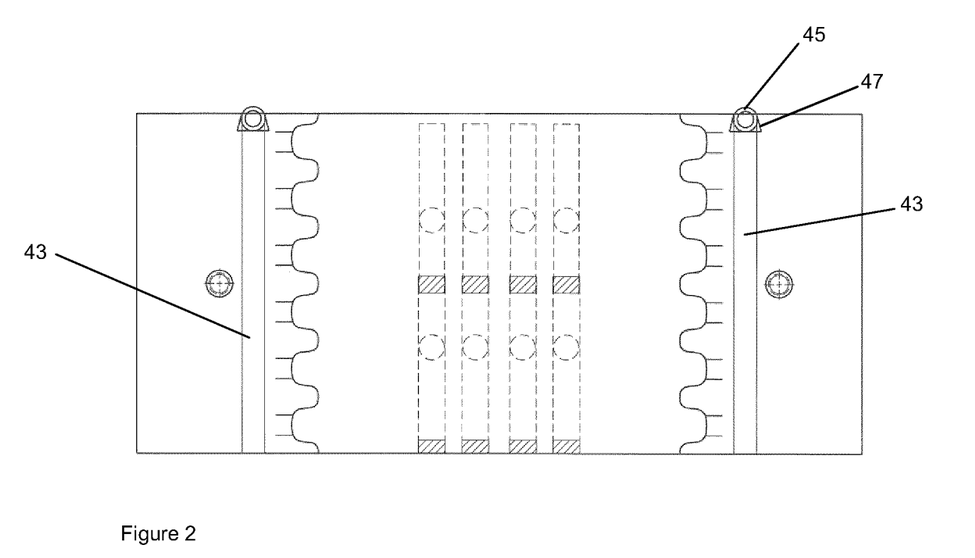
FIG. 2 is a top view of a single mold block a first embodiment looking downwardly into the open mold cavity.
Figure 3:
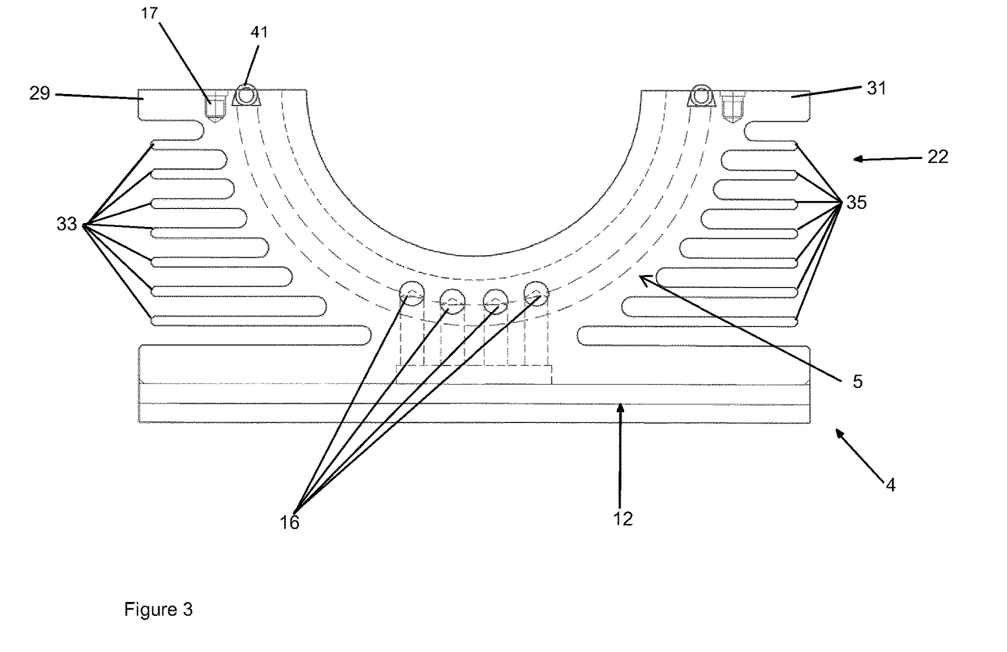
FIG. 3 is a front side view of the mold block of FIG. 2.

The follow description pertains to a finned mold block. More particularly, two preferred finned mold blocks are described as examples. The first example embodiment of the finned mold block is depicted in FIGS. 1 to 3, whereas the second example embodiment of the finned mold block is depicted in FIGS. 6 to 9.

Figure 1A:
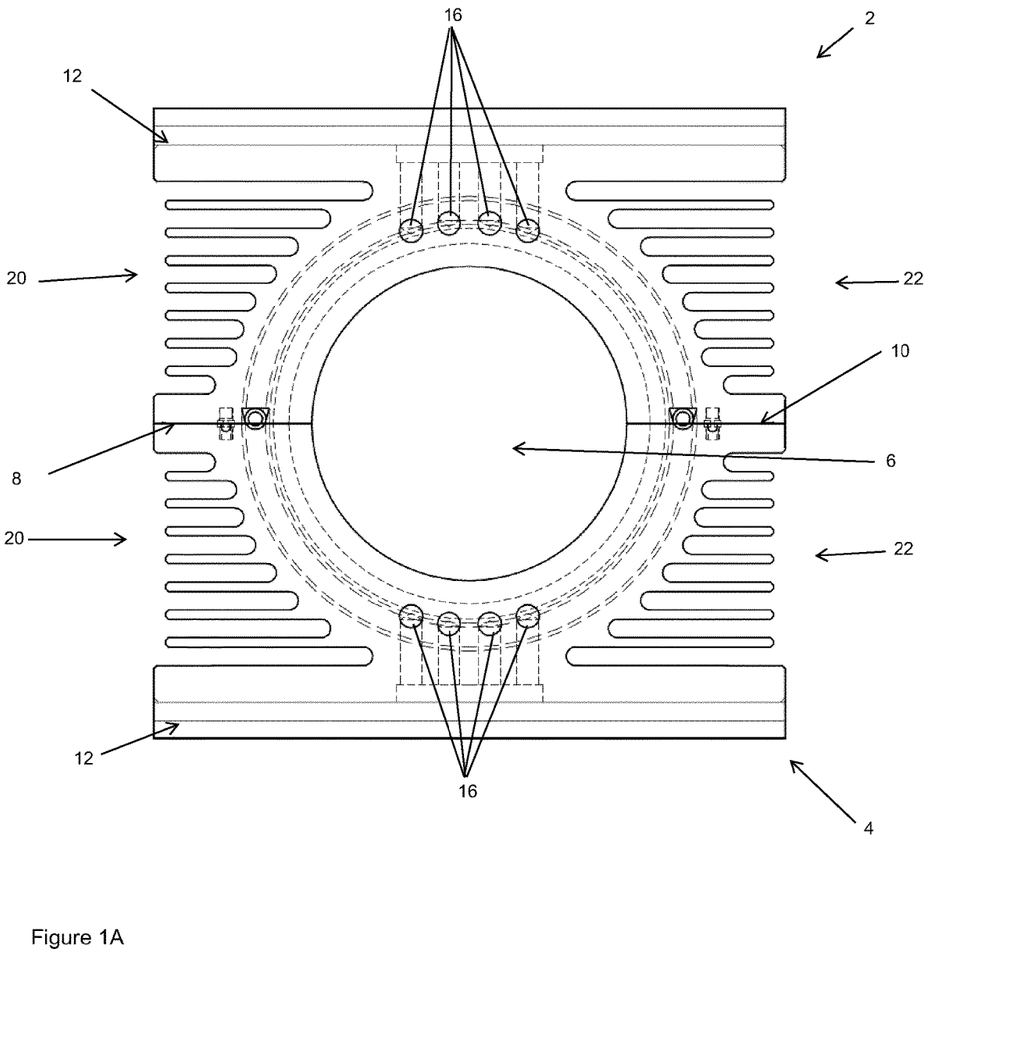
FIG. 1A is an end view of a first embodiment of two opposed mold blocks in abutment defining a pipe mold cavity.
Figure 1B:
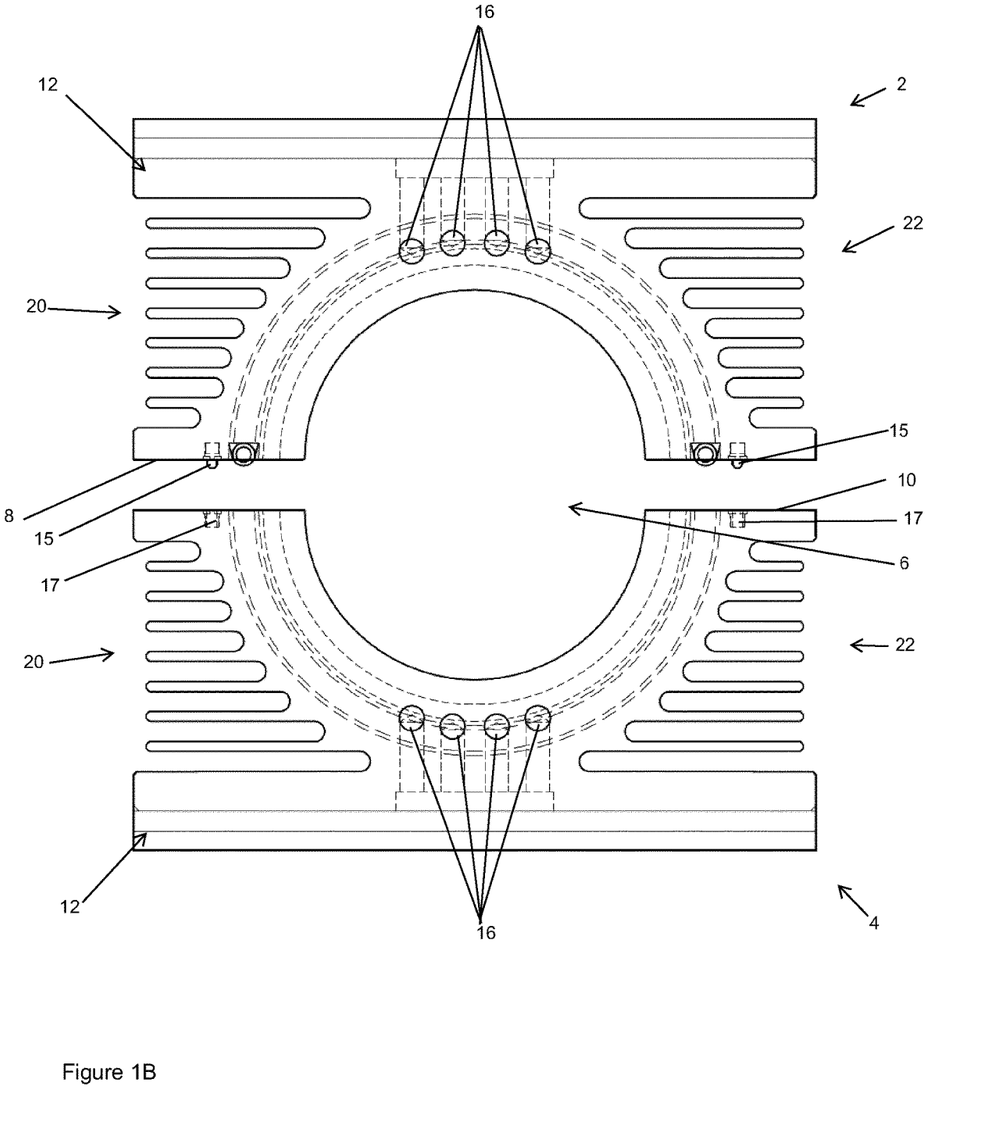
FIG. 1B is an end view of a first embodiment of two opposed mold blocks in a separated position.
Figure 6:
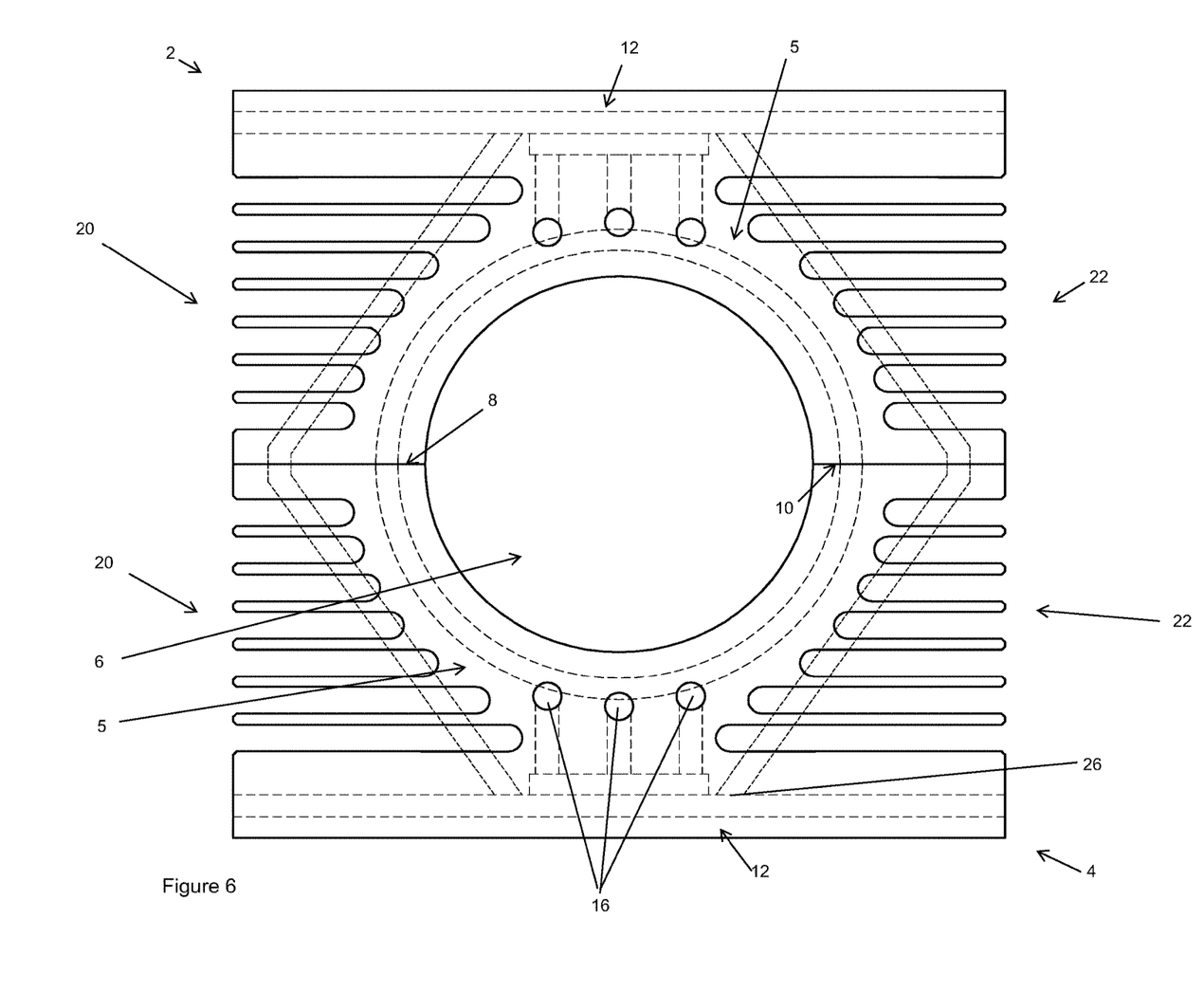
FIG. 6 is an end view of a second embodiment of two opposed mold blocks in abutment defining a pipe mold cavity.

The two opposed mold blocks of FIGS. 1A, 1B, and 6, are orientated as a top mold block 2 and a bottom mold block 4, however it is also known that corrugators can have the mold blocks arranged as right and left side mold blocks.

The improved mold blocks will be described as top and bottom mold blocks for convenience, however other orientations of the mold blocks can be used and are included in the present invention. The top mold block 2 and the bottom mold block 4 cooperate to define the interior pipe molding cavity 6. The top mold block includes a split contact face 8 that abuts with split contact face 10 of the bottom mold block to define part of the length of the pipe mold cavity 6. The abutting mold blocks move as a pair of mold blocks from an inlet of a pipe corrugator, through the length of the pipe corrugator and separate from each other at an exit of the pipe corrugator. Each of the mold blocks is then returned to an inlet of the pipe corrugator where the mold blocks again abut and cooperate with an extruder for receiving a thin envelope of plastic and drawing it into the pipe mold cavity.

Each of the mold blocks include a mold block base 12 for cooperating with a drive of the corrugator. The mold blocks also include vacuum and/or cooling channels 16 that are provided in the mold block body 5 and connect with the mold cavity 6. The finned mold block configuration improves heat transfer from the mold blocks to the surrounding atmosphere. Each mold block includes a first and a second bank of heat dissipating fins shown as 20 and 22 in FIG. 3. The heat dissipating fins are thin and elongated, extending generally outwardly from the mold block body 5. The heat originates with the extruded plastic and heat is thermally removed to set the plastic. This mold block design improves heat transfer and can be used to adjust or control the rate of heat transfer by varying the airflow across the fins. For many applications, the main advantage is the increased rate of heat transfer.

Heat dissipation fins on mold blocks assist in heat transfer through the mold blocks by conduction. The atmosphere provided exterior to the mold block and in the channels between fins, allows for heat transfer from the mold block to the atmosphere by convection. Heat transfer by conduction is more efficient than heat transfer by convection and the rate of heat transfer by convection is generally a function of the air movement or atmosphere movement at and across the finned surfaces and the relative temperatures. If pressurized air is directed from the exterior of the mold block onto the sides of the mold blocks, further increases in the rate of heat transfer can be realized.

Much of the heat from the molded plastic is stalled in the mold block body 5, located between the mold cavity 6 and the fins 20 and 22. Reducing the mass of this portion of the mold block improves the heat dissipation from the mold block to the surrounding atmosphere. By including elongated, thin fins with bases as close to the body 5 of the mold block and mold cavity 6 as possible, heat transfer is further increased. By providing the elongated thin fins, the gap between fins can extend further into the body 5 of the mold block than traditional mold block designs. With the elongated fins, the mass that would typically lie between adjacent fins is removed, thus decreasing the mass of the mold block and improving heat transfer. In a preferred embodiment, the bases of the fins are configured to generally follow the radius of the mold cavity to allow for the base of all fins to be similar or the same horizontal distance from the mold block cavity.

When in abutment, mold block pairs are held relative to each other using a pin and hold connection. One of the mold block pairs includes pins 15 extending outwardly from the split contact face, while the other mold block includes a corresponding hole in the split contact face into which the at least one connecting pin can engage. At least one pin/hole pair is included on each side of the mold block, however, it can be appreciated that more pins/hole arrangements could be used. This pin arrangement maintains the position of the top mold block to the bottom mold block mold tunnel of the corrugator. Traditionally, the pin and corresponding hole have been located on or in the body 5 of the mold block. As a result, the mold block bodies have needed to be large enough to allow for the inclusion of a pin or corresponding hole and split contact face seal.

In a preferred embodiment shown in FIGS. 1-3, the connecting pin and corresponding hole 17 are located exterior to the split contact face seal 41. There is at least one pin/hole pair on each side of the mold block. In this preferred embodiment, they are located at the inner edge or base of a top fins 29 and 31 which allows for the thickness of the body 5 to be reduced. The preferably thicker top fins 29 and 31 along with the base 12, provide structural stability to the mold block to prevent twisting of the mold blocks during use. By providing relatively thin cooling fins adjacent the mold cavity on either side of the mold block, the overall mass of the mold block is reduced. In a preferred embodiment, providing the fins adjacent the mold block allowed for a 20 percent reduction in mass of the mold block when compared to traditional non-finned designs.

Furthermore, it is preferred that exterior ends 33 and 35 of the heat dissipating fins 20 and 22 respectively, are inset from the ends of the top fins 29 and 31 and the base 12. Insetting the fins relative to the top fins 29 and 31 and the base 12 provides protection to the fin banks 20 and 22.

Figure 4:
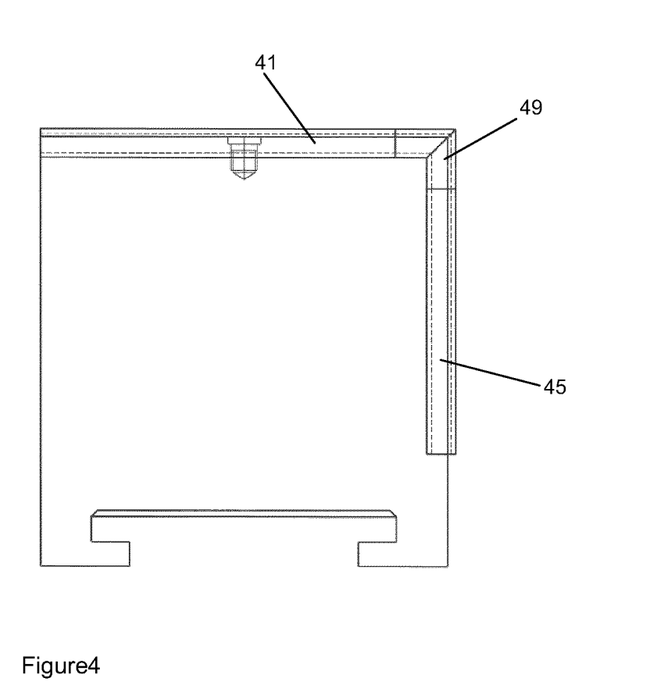
FIG. 4 is a left side view of a mold block showing the sealing arrangement.

FIG. 4 shows a split contact face seal 41, typically made of a flexible heat resistant tubing, such as silicon or rubber, although other suitable materials would be known to a person skilled in the art. To create a seal between the top mold block 2 and the bottom mold block 4, the tubular seal is placed and/or secured in seal channels 43 located on the split contact face 10 of the bottom mold block. As the top and bottom mold block come into abutment and vacuum is applied to pull the plastic into the mold blocks, this top seal prevents leakage of the vacuum pressure between the abutting top and bottom mold. In this example, the bottom mold block included the seal channels 43, however it can be appreciated that the top mold block could alternatively be configured to house the seal and seal channel.

A second seal 45 is located on a vertical face of the mold block. When one mold block pair abuts the next mold block pair in the mold tunnel, this second seal is compressed between adjacent faces of the two mold block pairs. As can be seen in FIG. 2, the second seal 45 fits into a second seal channel 47. The second seal channel preferably runs from one side of a vertical face of the mold block to the second side of the vertical face of the mold block in a semi-circular manner which follows the general shape of the mold cavity. However, it can be appreciated by a person skilled in the art that other seal arrangements would be possible.

In order to connect the split contact face seal 41 to the second seal 45, a corner seal 49 is used. The corner seal 49 is preferably integrally or monolithically formed and is coupled to the contact face seal 41 and second seal 45 by a spigot. The spigot frictionally engages the interior of the tubular seals to keep adjacent seal portions coupled. By providing a corner seal 49, loss of pressure or vacuum pressure between both the top and bottom mold block and adjacent mold block pairs is reduced.

Figure 5:
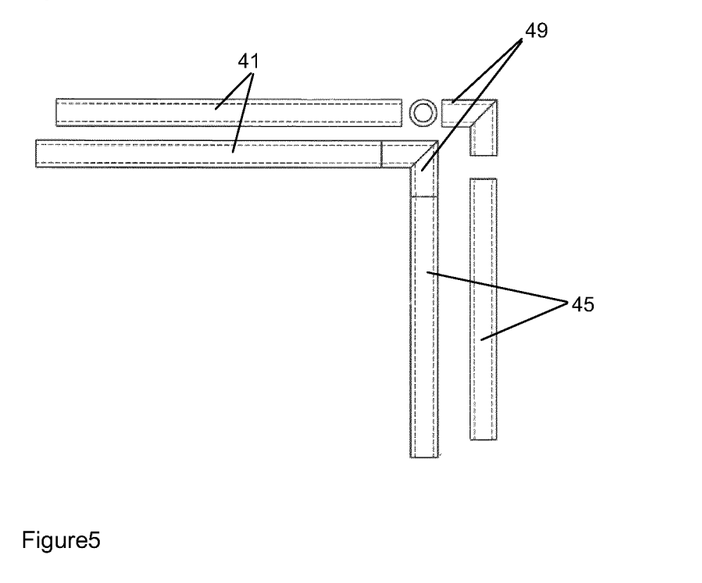
FIG. 5 is a side view of the seal showing both assembled and exploded views.

While the seal arrangement showing in FIGS. 4 and 5 are made in 3 pieces, it can be appreciated that the split contact face seal 41, second seal 45 and corner seal 49 could be formed as a single piece or as two pieces with the corner piece formed integrally with either the first seal 41 or second seal 45.

Figure 7:
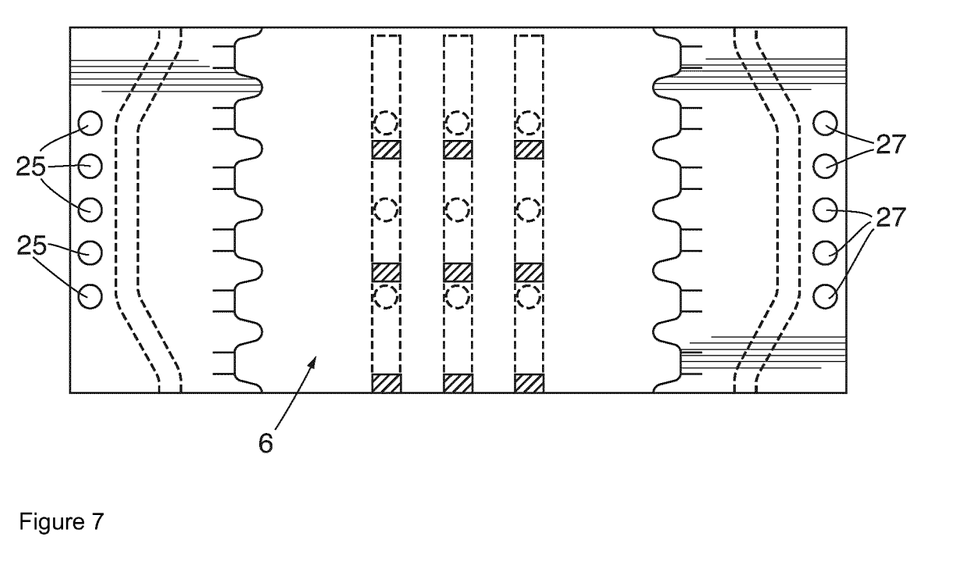
FIG. 7 is a top view of a single mold block the second embodiment looking downwardly into the open mold cavity.

In the preferred embodiment shown in FIG. 2, the split contact face seal 41 runs parallel to the sides, or fin ends, of the mold blocks. This provides less movement of the seal and thus, less potential for leakage when compared to alternative designs, as shown in FIG. 7 which includes a straight middle portion with two side portions, each angled from the straight middle portion towards to the front or back faces of the mold block.

A second embodiment of the finned mold block is shown in FIGS. 6 to 9. In this alternative embodiment, the heat dissipating fins also include a series of connecting ports 25 and 27 through the base of the fins to improve airflow past and between the fins and in particular, improve airflow adjacent the base of the fins. By providing connecting ports 25 and 27 and the channel portions 24 and 26, additional air movement across the heat dissipation fins is realized. If pressurized air is directed from the exterior of the mold block onto the sides of the mold blocks, further increases in the rate of heat transfer can be realized. Without the communication ports the air at the base of the fins is restricted and may be generally stalled. By providing the communication ports, airflow can move between the fins and provides a further escape route for any air that is forced from the exterior of the mold block towards the mold block. Having these ports and channels also lead through the base and exhaust through transfer ports 29 and 31 also increases flow. Ports 29 and 31 can move over a vacuum source as they move along a pipe corrugator to further improve flow. This vacuum source can be adjusted manually or automatically to achieve a desired result such as a temperature range of the mold blocks exiting the molding tunnel to provide a further control for operator or automatic adjustment.

Figure 8:
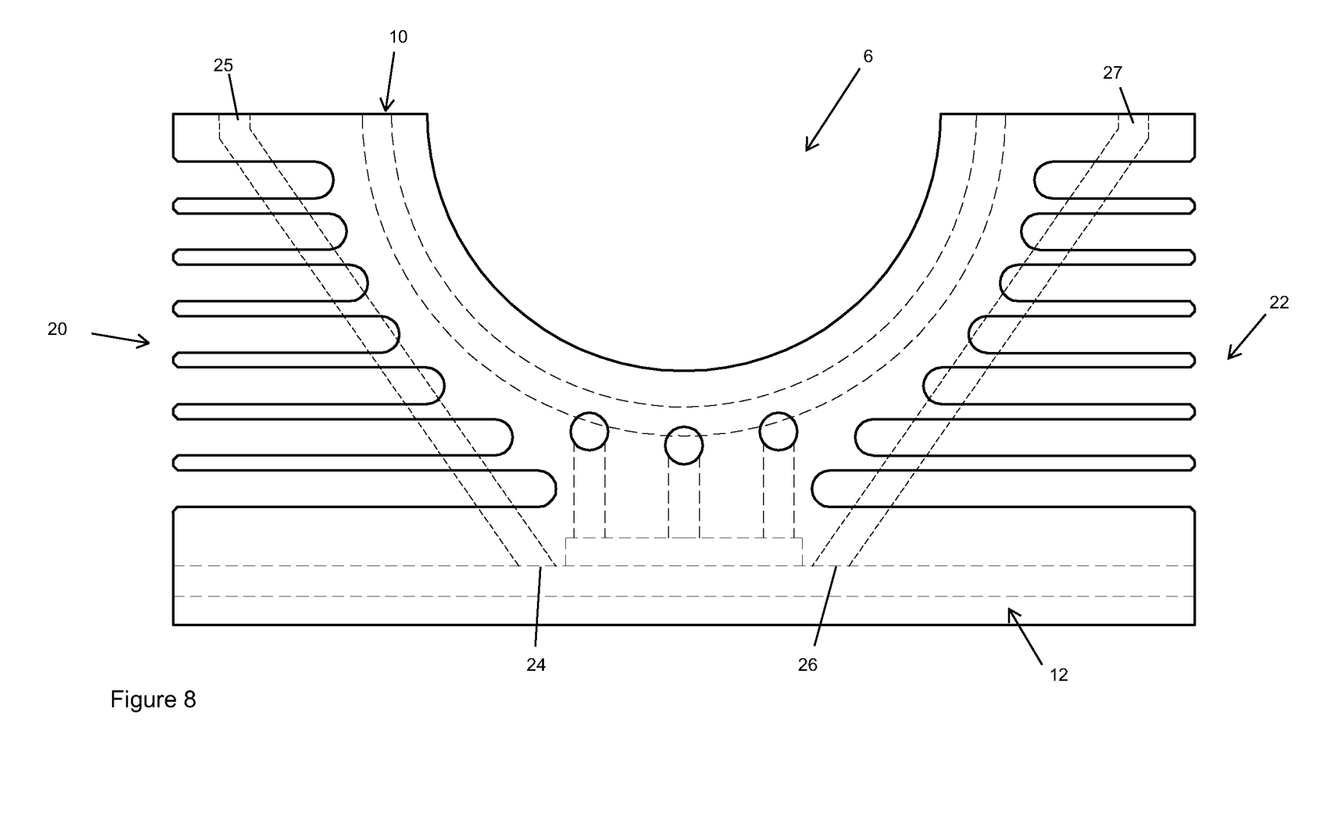
FIG. 8 is a front side view of the mold block of FIG. 7.
Figure 9:
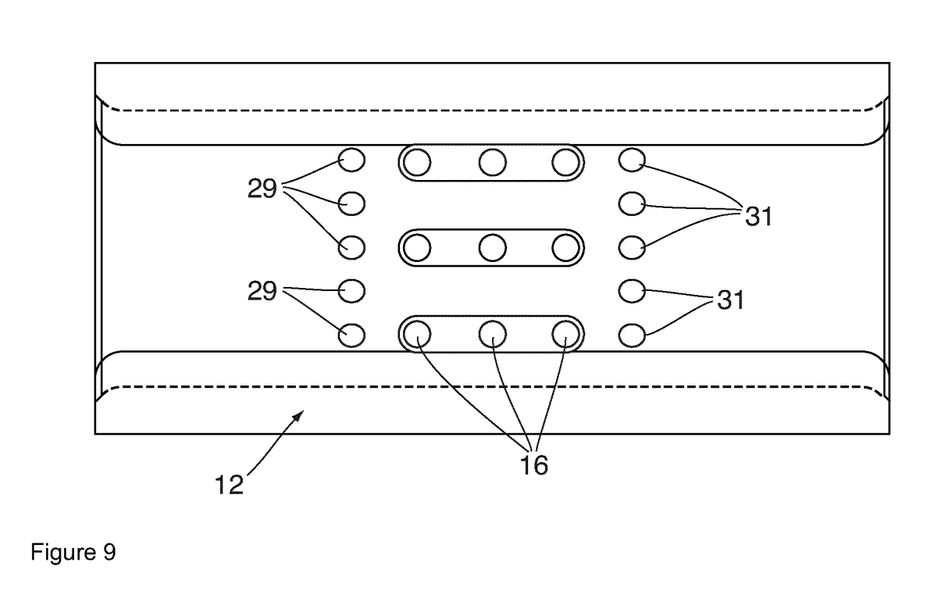
FIG. 9 is a bottom view of the second embodiment of the mold block.

As shown in FIG. 8, these communication channels 24 and 26 between fins are aligned and preferably formed by drilling passages through the mold block at an angle such that the drilled passage intersects with fins adjacent the base of the fins and the mold body 5. By providing the series of communication ports along the length of the mold block, improved air movement across the fins can be realized.

Drilling of the passageways to form channels 24 and 26 is easily accomplished and connecting of the base of adjacent fins using the connecting ports has significantly improved the rate of heat transfer from the mold blocks.

The base of the fins with the connecting ports allows for air movement out of the gap between the fins to improve the rate of heat transfer from the finned mold blocks to the surrounding atmosphere when compared to traditional mold block designs.

While it can be appreciated that the thickness of the fins would vary in accordance with the size of the mold block, in a preferred embodiment of each fin mold block design, each fin has a thickness of 3 to 5 mm. This range provides relatively strong fins which are desirable to avoid damage during use or handling of the mold blocks. The size of the gap between adjacent fins can also in accordance with the size and properties of the mold block, however in a preferred embodiment, the gap is about 1 to 4 times the fin thickness. In a further preferred embodiment, the gap between adjacent fins is 1 to 2 times the fin thickness to provide improved heat dissipation. Air can be forced or directed against the open ends of the fins of the mold blocks. In a design having connecting ports, such as the embodiment shown in FIGS. 6 to 9, a vacuum assist can be provided preferably through the base of the mold blocks.

Finned Mold Block Performance

The heat dissipation capabilities of the finned mold blocks has been described with respect to forcing air or cooling airflow across the finned mold blocks from the sides of the mold blocks with the air moving across the fins and exiting at the base of the mold blocks or at least capable of exiting adjacent the base of the mold blocks. The modified finned mold block with connecting ports can be used in combination with an air pressure differential to enhance airflow movement across the fins.

Figure 10:
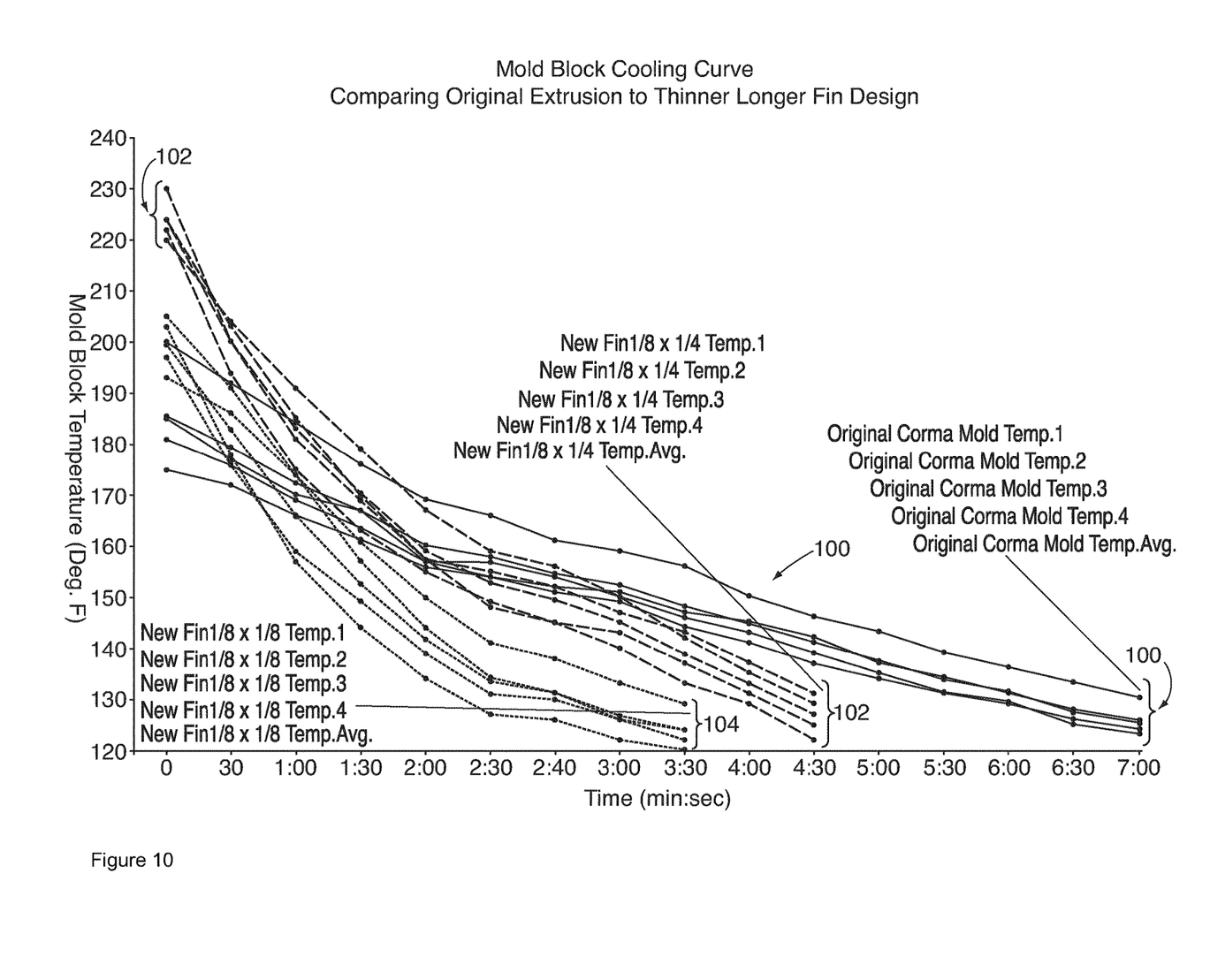
FIG. 10 is a graph showing mold block temperatures versus time for conventional type mold blocks, an improved intermediary finned mold block and a further improved mold block establishing proof of concept with respect to improved heat dissipation.

The graph of mold block temperature versus time in FIG. 10 provides some preliminary data establishing proof of concept with respect to improved heat transfer rates of the finned mold blocks. A standard mold block without the opposed series of fins was compared to two finned mold blocks. Each mold block was heated to a high temperature and then allowed to cool in the presence of forced air.

The first set of data lines 100 shows a traditional mold block that does not include the first and second bank of heat dissipating fins. The mold block was heated to a temperature in the range of 175° F. to 200° F. and the time required to drop this temperature to the range of 130 to 140° F. was approximately 7 minutes.

In contrast, the finned mold block set of data lines 102 illustrates an improvement in the rate of heat dissipation. The thickness of the fins of this mold block were 3 mm and the gap between fins was 6 mm. The mold block was raised to a temperature of 220 and 230° F. and the time required to drop mold blocks to less than 135° F. was approximately 4½ minutes.

A further improvement in heat dissipation of the mold blocks is shown in the set of data lines 104. This mold block had fins 3 mm thick with a gap between fins of 3 mm. The original temperature of the mold block was in the order of 190 to 210° F. and the temperature of this mold block was reduced to between 120 and 135° F. within 3 minutes and 30 seconds. The individual line of each set of data lines is based on heat sensors spaced along the mold block and measure a fin temperature.

With respect to the two different fin mold blocks, the original temperature of the mold blocks was higher yet the time to drop the mold block temperature to the lower value was reduced from approximately 7 minutes to 4 minutes and 30 seconds in one case and 3 minutes and 30 seconds in another case. In each of these examples the original temperature of the mold blocks was higher.

Both finned mold blocks had increased rates of heat transfer and function well.

As shown by the relative performance lines of the graph of FIG. 10, the improved finned mold blocks with connecting ports through the fins significantly improve the ability to remove heat and/or adjust the rate of heat removal. For example, after the plastic of a molded product has initially set, the airflow across the fins can be increased to provide more cooling if needed. Heat removal has been described primarily during the forming operation; however, it is also used to remove heat when mold blocks are returned from the exit of the mold tunnel to the inlet to the mold tunnel.

Although preferred embodiments have been described in the Detailed Description, the invention is not limited to the preferred structure and is defined by the following claims.

The embodiments of the invention in which an exclusive property or privilege is claimed are defined as follows:

1. A split mold block for use in a pipe molding corrugator, the split mold block comprising:
    a metal body with an interior mold cavity in one side of the mold block for defining an exterior configuration of a molded pipe,
    a base portion shaped for connecting with a drive mechanism;
    a split face having a surface, the split face being located at an opposite end of the mold block from the base portion; and
    two opposed side portions adapted to transfer heat from the mold block to a surrounding atmosphere by convection, the opposed side portions include cooling fins forming an exterior of the mold block and a top fin located at an end of the mold block opposite the base portion, the top fin and the base portion each have a respective outward edge, and the cooling fins are configured such that an outward edge of each of the cooling fins is inset from the outward edges of the top fin and the base portion, and
    wherein the cooling fins are located at a position exterior to the mold cavity.

2. The split mold block as claimed in claim 1, wherein the cooling fins are orientated to be generally parallel to a longitudinal axis of the mold cavity.

3. The split mold block as claimed in claim 2, further comprising a seal on the split face surface and a coupling apparatus located between an edge of the cooling fins and the seal.

4. The split mold block as claimed in claim 1, wherein the cooling fins are of different lengths and progressively increase in length from the split face surface of the mold block towards the base portion.

5. A split mold block for use in a pipe molding corrugator, the split mold block comprising:
    a metal body with an interior mold cavity in one side of the mold block for defining an exterior configuration of a molded pipe,
    a base portion shaped for connecting with a drive mechanism;
    a split face having a surface, the split face being located at an opposite end of the mold block from the base portion;
    two opposed side portions adapted to transfer heat from the mold block to a surrounding atmosphere by convection, the opposed side portions include cooling fins forming an exterior of the mold block;
    a seal on the split face surface; and
    a coupling apparatus located between an edge of the cooling fins and the seal, and
    wherein the cooling fins are located at a position exterior to the mold cavity,
    wherein the cooling fins are orientated to be generally parallel to a longitudinal axis of the mold cavity, and
    wherein the cooling fins are of different lengths and progressively increase in length from the split surface of the mold block towards the base portion.

6. The split mold block as claimed in claim 5, wherein adjacent cooling fins are separated by a gap, wherein the gap is 1 to 4 times as wide as a thickness of one of the cooling fins.

7. The split mold block as claimed in claim 6, wherein the gap between adjacent cooling fins is 1 to 2 times as wide as the thickness of one of the cooling fins.

8. A split mold block for use in a pipe molding corrugator, the split mold block comprising:
    a metal body with an interior mold cavity in one side of said mold block for defining an exterior configuration of a molded pipe,
    a base portion shaped for connecting with a drive mechanism;
    a split face having a surface, the split face being located at an opposite end of the mold block from the base portion; and
    two opposed side portions adapted to transfer heat from the mold block to a surrounding atmosphere by convection, the opposed side portions include cooling fins forming an exterior of the mold block,
    wherein the cooling fins are located at a position exterior to the mold cavity, and
    wherein the cooling fins include connecting ports passing through the cooling fins to enhance air flow across the cooling fins for improving heat transfer during use of the mold block.

9. The split mold block as claimed in claim 8, wherein the connecting ports are provided in the cooling fins to one side of a junction of the cooling fins to the metal body.

10. The split mold block as claimed in claim 9, wherein the connecting ports are a series of connecting ports spaced in each side of the mold block and spaced in a length of the split mold block.

11. The split mold block as claimed in claim 10, wherein each series of connecting ports is an aligned series of communication ports downwardly and inwardly angled from the split face surface of the mold block towards the base portion.

12. A pipe corrugator having two series of mold blocks cooperating to form a moving mold tunnel, and wherein each of said mold blocks are of a structure as defined in claim 1.

13. The pipe corrugator as claimed in claim 12, wherein the cooling fins of said mold blocks are orientated to be generally parallel to a longitudinal axis of the mold cavity.

14. The pipe corrugator as claimed in claim 13, wherein said mold blocks further comprise a seal on the split face surface and a coupling apparatus located between an edge of the cooling fins and the seal.

15. The pipe corrugator as claimed in claim 14, wherein the cooling fins of said mold blocks are of different lengths and progressively increase in length from the split face surface of said mold block towards the base portion.

16. The pipe corrugator as claimed in claim 15, wherein a gap between adjacent cooling fins of said mold block is 1 to 3 times as wide as a thickness of one of the cooling fins.

17. The pipe corrugator as claimed in claim 16, wherein the gap between adjacent cooling fins of said mold block is 1 to 2 times as wide as the thickness of one of the cooling fins.

* * * * *